April 29, 1952     K. C. ALLISON     2,594,840
RIVETED JOINT
Filed April 29, 1946
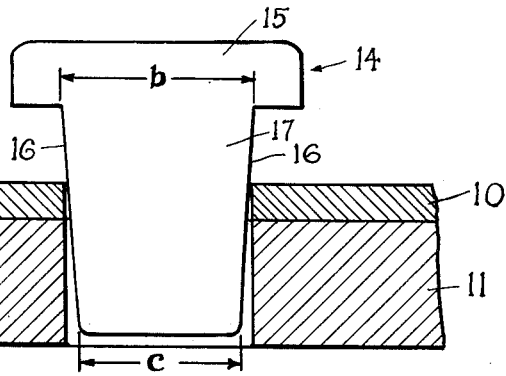
Fig.1.
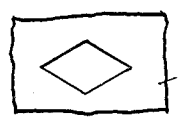
Fig.7.
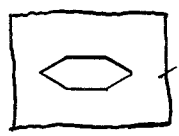
Fig.8.
Fig.9.
Fig.10.
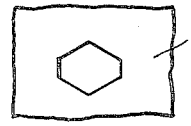
Fig.11.
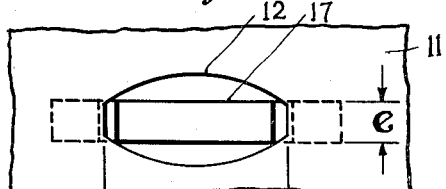
Fig.2.
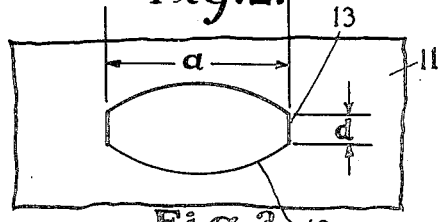
Fig.3.
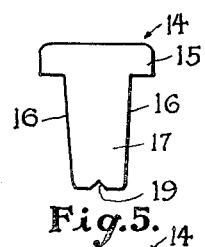
Fig.5.
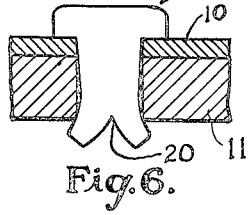
Fig.6.
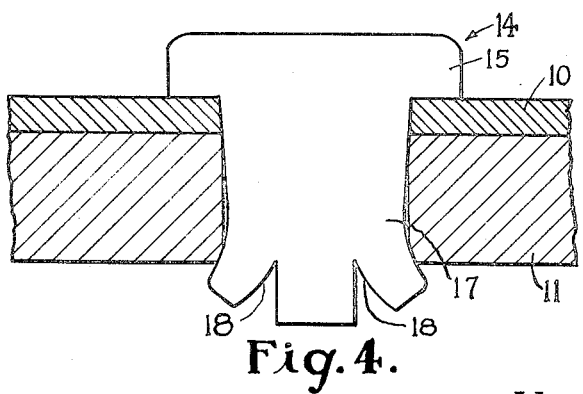
Fig.4.
INVENTOR.
Kenneth C. Allison
BY
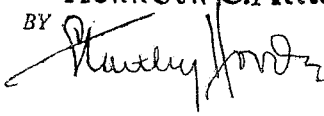

Patented Apr. 29, 1952

2,594,840

UNITED STATES PATENT OFFICE 2,594,840

RIVETED JOINT

Kenneth C. Allison, Crystal Lake, Ill., assignor to Grigsby-Allison Company, Inc., Arlington Heights, Ill., a corporation of Illinois Application April 29, 1946, Serial No. 665,761

3 Claims. (Cl. 78—54)

This invention relates to improvements in the construction and assembly of a structural unit comprising a pair of members having aligned openings formed therein and a securing device extendable through said openings and having a driven fit therewith when in final projection therein.

It is an object of this invention to provide a securing device in combination with parts of a structural unit comprising two or more members, each provided with an opening for the reception of said securing device, wherein the relative dimension and contour of said openings and securing device accommodates relative rotation of the members peripherally of said openings while the securing device is in an initial projected position therein, and to grip the securing device to cause the openings to be held in a coincident position while the securing device is in a projected position therein intermediate said initial and a final projected position.

It is also an object of this invention to provide a securing device of this character which is readily manufactured on an extensive scale at relatively low cost, and to provide a securing device which, in combination with preformed openings in structural members to be joined as contemplated by this invention, permits easy placement of the securing device in the openings and which when in finally projected position is readily anchored in place with minimum effort.

With the above and other objects in view, as will be apparent, this invention consists in the construction, combination and arrangement of parts, all as hereinafter more fully described, explained and illustrated in the accompanying drawing, wherein:

Fig. 1 is a view, partly in side elevation and partly in section, showing the securing device and the members to be secured together thereby in a position prior to initial projection of the securing device through the openings provided in said members.

Fig. 2 is an end view of the arrangement shown in Fig. 1 as the same would appear from the underside of the members.

Fig. 3 is a detail plan view of the opening provided in the members shown in Figs. 1 and 2.

Fig. 4 illustrates the securing device in final projected position, with its free end longitudinally split and spread for engagement with the edges of the opening to prevent withdrawal.

Fig. 5 and Fig. 6 show a similar securing device in final projected position and in a finally installed position, respectively, with a modified form of anchorage to prevent its withdrawal from the opening.

Figs. 7 to 11, inclusive, illustrate forms of openings of various shapes and contours with which a securing device as contemplated herein may be used in accordance with this invention.

In the selected embodiment of the invention disclosed herein, there is shown, in Figs. 1, 2, and 3, a structural unit comprising a pair of panels or work members 10 and 11 adapted to have face to face engagement. Each of the work members 10 and 11 is provided with an opening of non-circular contour so as to present opposed peripheral edge portions 12 spaced apart lengthwise of the shortest transverse axis of the opening and similar edge portions 13 spaced apart lengthwise of the longest transverse axis of the opening.

An important feature of the present invention resides in the means provided for securing the work members 10 and 11 in rigid assembly. Such a means preferably comprises a securing device formed of sheet metal stock to provide a shank 14 extendable through the openings in the work members 10 and 11 and having an integral head 15 at one end thereof adapted to engage the outer surface of one of said members when the shank is in final projected position through the opening in said member to retain the shank against withdrawal therefrom in the direction of the other member. The body of the shank 14 is so formed as to provide opposed edges or faces 16 throughout the length thereof which converge inwardly in a direction away from said head 15 and opposed faces 17 with which said edges or faces 16 cooperate or combine to form corners spaced at gradually increased distances apart through the length of the shank 14 in the direction of the head 15. The spacing of the corners adjoining the head 15, represented by the letter $b$, is greater than the distance between the edge portions 13 of the opening in the members 10 and 11, said distance being represented by the letter $a$. The spacing of the corners at the free end of the shank 14, represented by the letter $c$ is less than the distance between the edge portions 13. The length of the edge portions 13 of the openings, represented by the letter $d$ is less than the distance between the opposite faces 17 (or width of the edges 16) of the shank 14, represented by the letter $e$. Consequently, the edges 12 and 13 of the openings are deformed and stretched by the corners of the shank 14 as a result of driving the shank 14 into a final projected position in the openings in the members 10 and 11 by the corners of the shank 14 adjoining said head 15. However, the relative dimensions *a* and *d* of the openings and the dimensions *c* and *e* of the shank, are such as to accommodate relative rotation of the members 10 and 11 peripherally of the openings while the securing device is in an initial projected position therein, and to gradually have the edges 12 and 13 of the openings grip the shank corners to cause the openings to be held in a coincident position while the securing device is in a projected position therein intermediate said initial and a final projected position. As a result, the members 10 and 11 are acted upon during initial projection of the shank 14 with a slight torsional strain to relatively turn the panels 10 and 11 peripherally of the edges of the openings, from a position wherein said openings are slightly out of selected alignment to a position of selected alignment prior to final projection of the shank 14 into a position to deform and spread the material of the members 10 and 11 adjoining the head 15.

The corners of the portion of the shank which are spaced apart a distance less than the dimensions *a* and *d* of the openings in the members 10 and 11, and therefor not effective to stretch the edges of the openings as the shank 14 is moved into final projected position, are subsequently located in a position to retain the shank against withdrawal from the openings in the direction of the head 15, by splitting the shank free end as at 18, shown in Fig. 4, or as at 20, shown in Fig. 6, wherein the split free end of the shank is spread apart to cause the corners to deform and have rigid engagement with the material of the members 11 adjacent the opening formed therein.

The form of openings illustrated in Figs. 7 to 11 inclusive, indicate that a wide variety of contours may be employed in connection with a securing device of the design and construction contemplated by this invention, with the same result obtained in the arrangement shown in Figs. 1 to 6, inclusive. As in the construction described in connection with Figs. 1 to 6, the area of the openings in Figs. 7 to 11 is greater than the transverse cross-sectional area of the shank 14 defined by dimensions *c* and *e* while said area of the openings contains an area in predetermined relation to the transverse axes of the openings bounded by edge portions which coact with the corners of the shank to grip the shank to cause the openings to be held in a coincident position while the securing device is in a projected position therein intermediate said initial and a final projected position, and which are spread to accommodate final projected position of the shank.

Accordingly, the present invention provides a securing device in combination with work members having aligned openings through which said securing device is extendable and which allows for a slight difference in tolerance in the relative position of the openings in the members to be fastened during the process of placing the securing device in final projected position, and which maintains a reliable grip therewith when in final projected position.

What is claimed is:

1. An assembly of the type comprising a pair of juxtaposed members and a securing device having a shank portion of a length greater than the aggregate thickness of said members adapted to be projected through an opening in each member to connect said members against separation axially of said openings by means of a head at one end of said shank and a laterally spread portion at the other end, said shank having two opposed flat faces of gradually diminishing transverse dimension in a direction away from its head, said transverse dimension being substantially greater than the dimension between said faces, said opening in each of said members being of non-circular contour and presenting outwardly convergent margins at opposite sides thereof coincident with similar margins of the opening in the other member with which margins the shank has wedging engagement, along edges of its said faces between and forming continuations of the edges which define the greatest and smallest transverse dimensions of said faces, to locate said members and said securing device in predetermined fixed position longitudinally and laterally of the base line toward which said margins converge, preparatory to intersection of said margins of the opening in the member nearest the head of the shank incident to seating said head against the surface of said latter member about said latter opening and preparatory to intersection of said margins of the opening in the member farthest from the head of the shank incident to lateral spreading of said edges defining the smallest transverse dimension of said faces of the shank.

2. An assembly as described in claim 1 wherein said opposed flat faces of the shank are parallel.

3. An assembly as described in claim 1 wherein the head of the shank presents opposed flat faces coplanar with the opposed flat faces of the shank.

KENNETH C. ALLISON.

REFERENCES CITED

The following references are of record in the file of this patent:

UNITED STATES PATENTS

| Number | Name | Date |
|---|---|---|
| 135,051 | West | Jan. 21, 1873 |
| 564,850 | Stone | Jan. 28, 1896 |
| 1,678,143 | Howard | July 24, 1928 |
| 1,996,128 | Thomson | Apr. 2, 1935 |
| 2,140,891 | Boyce | Dec. 20, 1938 |
| 2,194,458 | Eckler | Mar. 26, 1940 |
| 2,196,144 | Eckler | Apr. 2, 1940 |
| 2,236,804 | Miller | Apr. 1, 1941 |
| 2,291,743 | Muller | Aug. 4, 1942 |
| 2,453,504 | Fleischer | Nov. 9, 1948 |